United States Patent [19]

Miles et al.

[11] Patent Number: 5,515,188

[45] Date of Patent: May 7, 1996

[54] METHOD OF MANUFACTURING A LIQUID CRYSTAL DISPLAY DEVICE IN WHICH A VACUUM RESERVOIR ATTACHED TO THE LCD IS PLACED IN A CONFORMABLE CONTAINER OR BAG

[75] Inventors: Barry M. Miles, Plantation; Robert B. Akins, Coral Springs, both of Fla.

[73] Assignee: Motorola, Inc., Schaumburg, Ill.

[21] Appl. No.: 254,000

[22] Filed: Jun. 3, 1994

[51] Int. Cl.[6] .............................. G02F 1/13; B29C 65/00
[52] U.S. Cl. .......................... 359/062; 359/80; 156/285
[58] Field of Search .................... 359/62, 80; 156/273.5, 156/275.3, 275.5, 285

[56] References Cited

U.S. PATENT DOCUMENTS

| | | | |
|---|---|---|---|
| 4,725,517 | 2/1988 | Nakanowatari et al. | 430/20 |
| 4,957,349 | 9/1990 | Clerc et al. | 359/54 |
| 5,208,080 | 5/1993 | Gajewski et al. | 359/62 |

FOREIGN PATENT DOCUMENTS

| | | | |
|---|---|---|---|
| 1-056414 | 3/1989 | Japan | 359/62 |
| 1-296619 | 11/1989 | Japan | 359/80 |
| 4-246620 | 9/1992 | Japan | 359/62 |

*Primary Examiner*—Anita Pellman Gross
*Assistant Examiner*—Walter J. Malinowski
*Attorney, Agent, or Firm*—Dale W. Dorinski

[57] ABSTRACT

A liquid crystal device (5) is made by providing an LCD sandwich made of two glass substrates (20) with electrodes, spacers (21), and an uncured sealant (22). A gap (26) with a specified internal volume lies between the two glass substrates. A vacuum reservoir (23) having an internal volume substantially larger than the internal volume of the gap is temporarily attached to the LCD sandwich to align the glass substrates and hold them in place. The LCD sandwich and vacuum reservoir are placed into a conformable container or vacuum bag (24). A vacuum is drawn on the bag so that the bag walls contact the LCD sandwich, and the bag is sealed to maintain the vacuum. The assembly is then heated while under vacuum for a time and a temperature sufficient to cause the gap in the LCD sandwich to decrease to a desired final gap and to cure the sealant.

7 Claims, 2 Drawing Sheets

METHOD OF MANUFACTURING A LIQUID CRYSTAL DISPLAY DEVICE IN WHICH A VACUUM RESERVOIR ATTACHED TO THE LCD IS PLACED IN A CONFORMABLE CONTAINER OR BAG

TECHNICAL FIELD

This invention relates generally to electroluminescent devices, and in particular to methods of fabricating liquid crystal devices.

BACKGROUND

Liquid crystal devices (LCD's) employing electro-optical materials that vary their transmissivity in response to an applied electrical potential are commonly used in visual displays of information in applications such as computers, televisions, calculators, radios, automobile controls, and many other products. While display devices embodying these principles are well known, problems with the manufacture of such devices are also well known. One vexing problem is the difficulty in providing consistency of the gap between the two electrodes in the LCD. Since the performance of the device is a function of the consistency of the gap, it is important to accurately control this spacing for maximum uniformity. Improper spacing produces poor optical properties and promotes rapid deterioration of the liquid crystal fluid. Because of these and other problems, the manufacture of reliable, long-life liquid crystal displays remains somewhat of an art, rather than a science.

In the prior art, as represented by FIG. 1, the gap 16 is typically set in the liquid crystal display during the perimeter sealing process. An epoxy adhesive 12 is applied to one piece of glass 10. The spacers 11 are also applied to the glass 10, and then two pieces of glass are aligned for final cure of the adhesive 12. One process involves the use of a vacuum bagging technique to hold the glass plates together and apply the pressure necessary to set the gap as the epoxy is cured. The aligned LCD is placed into a vacuum bag 14, a vacuum is drawn on the bag, and then the opening in the bag is sealed by a heated bar on the end of the bag. The vacuum in the bag creates uniform pressure (typically equal to atmospheric pressure at sea level, about 760 Torr) over the LCD, as represented by the arrows in the drawing figures. The bagged assembly is then placed into an oven for curing of the epoxy. During this time, as shown in FIG. 2, the adhesive 12 softens when heated and flows out, allowing the gap 16 to collapse down to the level of the spacers 11, thereby setting the desired gap in the LCD. During this stage, the vacuum created in the bag is maintained, and the pressure from the external atmosphere forces the two glass plates together, setting the gap. During this time, the sealant 12 also cures to form a strong bond between the two glass plates 10. After final cure of the epoxy sealant, the display assembly can be removed from the bag, and the epoxy will hold the glass together at the gap determined by the spacers.

This process works well for twisted nematic (TN) type displays at gaps of around 10 microns. However, smaller gaps, necessary for super twisted nematic (STN) type displays, are not attainable using this procedure. This is due to the amount of epoxy adhesive placed onto the glass. Typically, epoxy is dispensed onto the glass at a thickness of 50–75 microns. Because of this thickness, the initial internal gap is much greater than the final 10 micron final gap. When the gap decreases during the heating phase, the volume of gas that was in the large gap is displaced to an area outside the glass plates, but yet inside the bag. When the temperature increases in the curing oven, the collapse of the glass plates moves this displaced volume to the outside of the plates, rather than in the gap, and thus the force exerted on the LCD sandwich is reduced. Scientists and those with skill in the art will remember that as a practical consequence, the vacuum in the bag is not a perfect vacuum, and some small amount of air still resides in the bag. When this air is heated, it expands, and the pressure inside the evacuated bag increases by about a factor of 30. Therefore, if the initial vacuum level inside the bag is around 20 Torr, it would result in a vacuum approaching one atmosphere (and hence no force at all on the LCD) during epoxy reflow and cure. The net result is that small gaps cannot be attained with this technique.

Clearly, an improvement in the state of the practicing art is needed that will allow one to manufacture LCD's with very small gaps, using the vacuum bagging technique.

DETAILED DESCRIPTION OF THE PREFERRED EMBODIMENT

Figure 1:
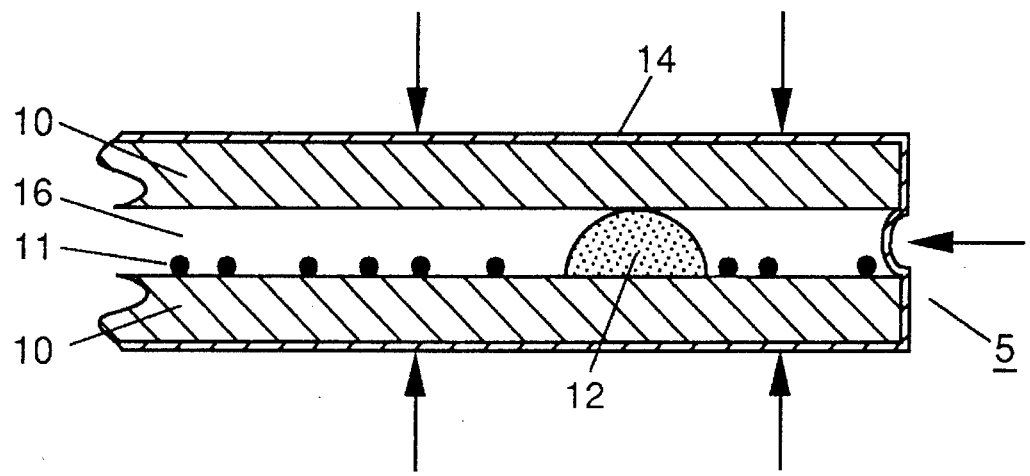
FIG. 1 is a cross sectional view of a vacuum-bagged LCD sandwich prior to heating, as practiced in the prior art.
Figure 2:
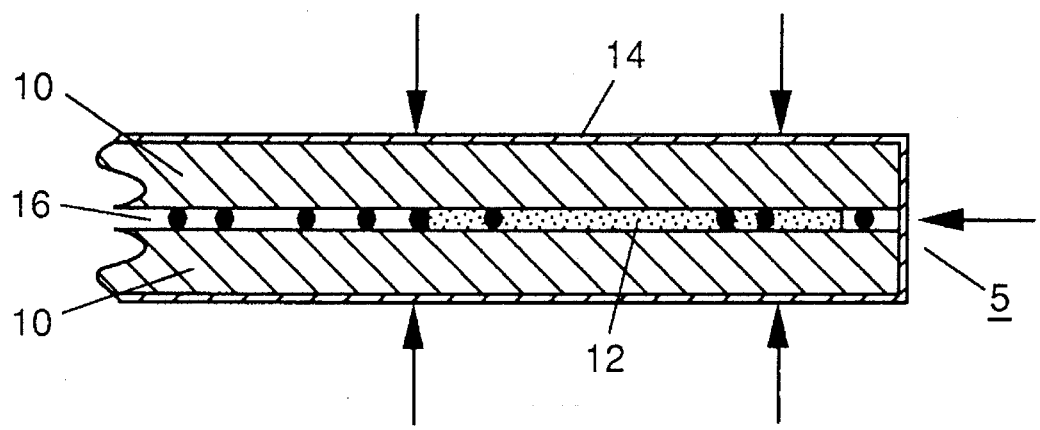
FIG. 2 is a cross sectional view of a vacuum-bagged LCD sandwich after heating, as practiced in the prior art.
Figure 3:
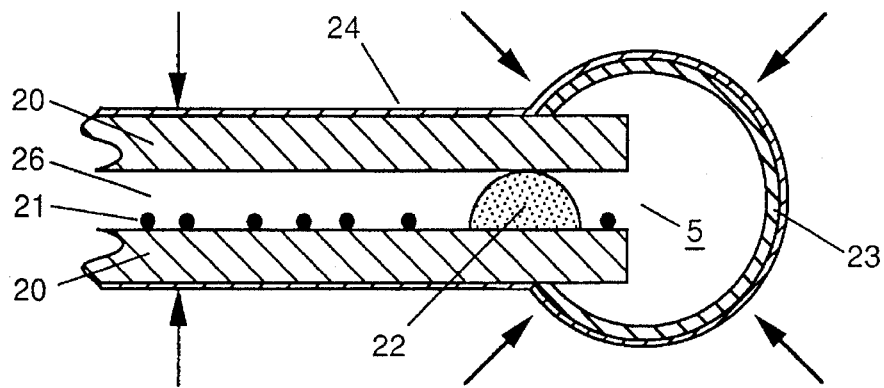
FIG. 3 is a cross sectional view of a vacuum-bagged LCD sandwich prior to heating, in accordance with the present invention.

While the specification concludes with claims defining the features of the invention that are regarded as novel, it is believed that the invention will be better understood from a consideration of the following description in conjunction with the drawing figures, in which like reference numerals are carried forward. Referring now to FIG. 3, an LCD sandwich 5 consists of: two pieces of glass 20 which have previously been patterned with transparent metal electrodes (not shown), spacers 21, and a bead of sealant 22. The sealant 22 is typically an epoxy. A vacuum reservoir 23 is connected to the LCD sandwich 5. The internal volume of the vacuum reservoir 23 should be large in comparison to the volume formed by the gap 26 between the two pieces of glass 20. The vacuum reservoir 23 may take the form of a clip which can serve to hold the two, previously aligned, pieces of glass together until the final sealing is accomplished, and it must have an internal space that will remain after the vacuum bag is drawn tight about it. In the preferred embodiment, the vacuum reservoir 23 is a piece of rigid tubing that has been slit down one side. The tubing is opened about the slit and placed edgewise on the LCD sandwich to hold the two glass plates together. The internal volume of the tubing creates a voided area that is much larger than the internal volume of the gap formed in the LCD sandwich. This allows the internal volume of the vacuum reservoir to act as a "vacuum ballast" or "vacuum buffer". The reservoirs 23 can take the form of specifically shaped clamps which act to hold the aligned glass plates together while in the vacuum bag.

Figure 4:
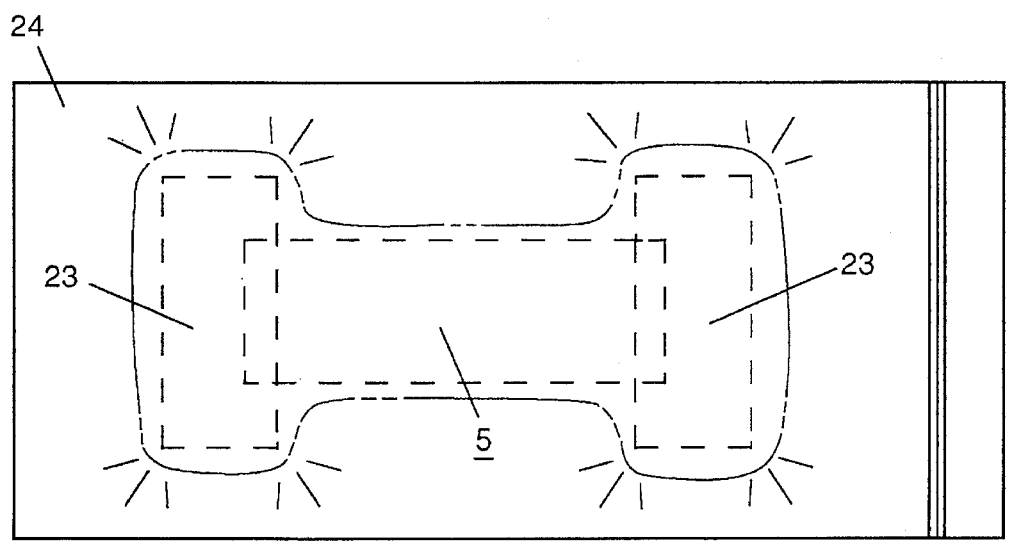
FIG. 4 is a cross sectional view of a vacuum-bagged LCD sandwich after heating, in accordance with the present invention.

The LCD sandwich 5 and vacuum reservoir 23 are then placed into a conformable container 24, typically a plastic bag, and a vacuum is imposed or drawn on the bag. The walls of the bag 24 then conform to the outside surfaces of the LCD sandwich 5 and the vacuum reservoir 23 due to the pressure exerted by the external atmosphere, which is approximately 760 Torr at ambient conditions. However, the internal voided volume created by the vacuum reservoir 23 is still maintained. At this point, the gap 26 is still relatively large, due to the height of the sealant 22. The container or bag 24 is then sealed to maintain the desired vacuum. One form of sealing is to use a commercially available heat sealing machine, such as the Vacuum Sealing Unit, manufactured by AZ LCD in Chandler, Ariz. The evacuation of the bag allows the external atmosphere to exert uniform pressure on all external surfaces of the LCD sandwich. FIG. 4 shows how the bag 24 conforms to the LCD sandwich with the vacuum reservoirs 23 after the vacuum is drawn on the bag, and the bag is sealed. The bagged LCD sandwich and vacuum reservoir are then placed into an oven at a temperature and for a time sufficient to cure the sealant 22. Typical curing conditions for an epoxy are 150° C. for 30 minutes.

Figure 5:
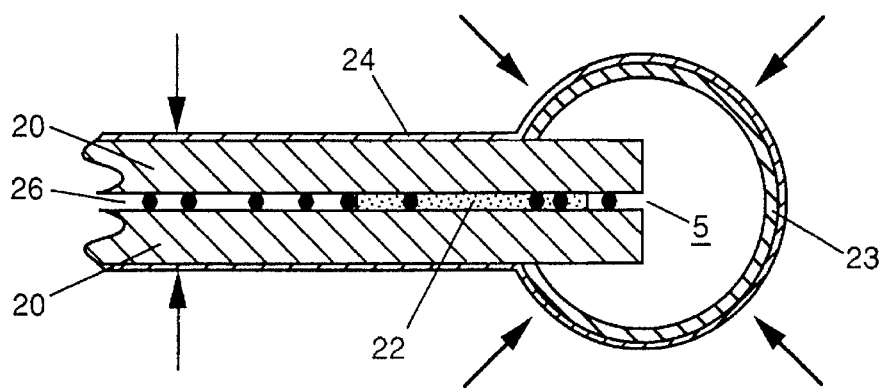
FIG. 5 is a plan view of a sealed, vacuum-bagged, LCD sandwich, in accordance with the present invention.

Referring now to FIG. 5, as the sealant 22 is heated, it softens and flows out, and the external pressures on the evacuated bag act on the LCD sandwich to decrease the gap to the desired distance which is determined by the diameter of the spacers 21. Continued heating causes the sealant 22 to cure and harden, bonding the two glass plates 20 together. Because the volume created by the vacuum reservoir 23 is very large compared to that of the gap 26, the reduction of the gap volume is insignificant compared to the total volume inside the bag, and thus the change in volume of the bag is minimized. This, when combined with the heating of the air remaining in the bag, does not cause appreciable change in the level of vacuum in the bag, and thus continues to exert full atmospheric force on the LCD sandwich. When compared to the conventional art, this allows the ultimate gap to be made much smaller, because the force on the LCD sandwich is maintained. As stated earlier, the pressure increase is controlled by the volume residing in the vacuum reservoir. The bagged LCD sandwich and vacuum reservoir are then removed from the oven and cooled to room temperature. The bag is opened, the bonded LCD sandwich is removed, and the vacuum reservoir is removed from the assembly.

The use of the temporary vacuum reservoir solves the problems of the prior art, and further eliminates the need to continuously evacuate the bag while curing the epoxy sealant material. The prior art process would either require a vacuum oven or would be cumbersome to set up and operate in a conventional oven. A vacuum hose would be needed to allow continuous pump-down of the conformable container, and would be difficult to route through the oven. The vacuum reservoir allows gap sizes as small as 3 microns to be created.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of manufacturing a liquid crystal device, comprising the steps of:

providing an LCD sandwich having a gap and an uncured sealant;

temporarily attaching a vacuum reservoir to the LCD sandwich;

placing the LCD sandwich and vacuum reservoir into a conformable container;

imposing a vacuum on the conformable container so that walls of the container contact the LCD sandwich;

sealing the container to maintain the vacuum; and heating the container while it is under vacuum for a time and a temperature sufficient to cause the gap in the LCD sandwich to decrease to a desired final gap and to cure the sealant.

2. The method as described in claim 1, further comprising a step, after the step of heating, of cooling the LCD sandwich.

3. The method as described in claim 2, further comprising a final step of removing the vacuum reservoir from the LCD sandwich.

4. The method as described in claim 1, wherein the step of temporarily attaching a vacuum reservoir comprises maintaining the LCD sandwich in alignment.

5. The method as described in claim 1, wherein the vacuum reservoir has an internal volume substantially larger than the volume of the gap.

6. A method of manufacturing a liquid crystal device, comprising the following steps in the order named:

providing an LCD sandwich having gap with a prescribed volume, and an uncured epoxy sealant;

temporarily attaching a vacuum reservoir to the LCD sandwich, the vacuum reservoir having an internal volume substantially larger than the volume of the gap, the vacuum reservoir maintaining the LCD sandwich in alignment;

placing the LCD sandwich and vacuum reservoir into a bag;

evacuating the bag so that the bag conforms to the LCD sandwich and the vacuum reservoir, and applies uniform pressure to the LCD sandwich;

sealing the bag to maintain a vacuum in the bag;

heating the bag for a time and temperature sufficient to cause the gap in the LCD sandwich to decrease to a desired final gap and to cure the epoxy sealant;

removing the vacuum reservoir from the LCD sandwich.

7. The method as described in claim 6, further comprising a step of cooling the LCD sandwich after the step of heating and prior to the step of removing the vacuum reservoir.

* * * * *